(12) United States Patent
Furutate et al.

(10) Patent No.: US 6,581,635 B2
(45) Date of Patent: Jun. 24, 2003

(54) PILOT-TYPE TWO-PORT VACUUM VALVE

(75) Inventors: Seiichi Furutate, Tsukuba-gun (JP); Masao Kajitani, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 163 days.

(21) Appl. No.: 09/797,594

(22) Filed: Mar. 5, 2001

(65) Prior Publication Data

US 2001/0023709 A1 Sep. 27, 2001

(30) Foreign Application Priority Data

Mar. 21, 2000 (JP) .......................... 2000-078286

(51) Int. Cl.⁷ .......................... F16K 37/00; F16K 11/00
(52) U.S. Cl. ...................... 137/556; 137/630; 137/637.2
(58) Field of Search ................. 137/556, 630, 137/637.2

(56) References Cited

U.S. PATENT DOCUMENTS

| | | | |
|---|---|---|---|
| 2,829,670 A | 4/1958 | Nix | |
| 4,041,980 A | 8/1977 | Grotloh | |
| 4,561,464 A | * 12/1985 | Frantz | .................... 137/596.18 |
| 4,721,284 A | 1/1988 | Bankard | |
| 5,848,608 A | 12/1998 | Ishigaki | |

FOREIGN PATENT DOCUMENTS

| | | |
|---|---|---|
| DE | 42 43 111 | 6/1994 |
| EP | 0 350 519 | 1/1990 |
| EP | 0 967 239 | 12/1999 |

* cited by examiner

Primary Examiner—Gerald A. Michalsky
(74) Attorney, Agent, or Firm—Oblon, Spivak, McClelland, Maier & Neustadt, P.C.

(57) ABSTRACT

A main valve mechanism for opening and closing a main flow path between a first port and a second port has a main valve body, a large-diameter first piston for opening the main valve body, a main pressure operating chamber for driving the first piston, and first spring means for closing the first piston. An auxiliary valve mechanism for opening and closing an auxiliary flow path has an auxiliary valve body, a small-diameter second piston for opening the auxiliary valve body, an auxiliary pressure operating chamber for driving the second piston, and second spring means for closing the second piston. The main pressure operating chamber and the auxiliary pressure operating chamber are connected to each other through a connecting hole. There are such relationships between piston diameters of both the pistons and repulsing forces of both the spring means that the second piston is actuated by lower fluid pressure than the first piston.

9 Claims, 3 Drawing Sheets

PILOT-TYPE TWO-PORT VACUUM VALVE

TECHNICAL FIELD

The present invention relates to a pilot-type two-port vacuum valve connected between a vacuum chamber and a vacuum pump and used for reducing pressure in the vacuum chamber to vacuum pressure.

PRIOR ART

For example, if gas such as process gas at atmospheric pressure or high pressure in a process chamber is exhausted rapidly in reducing pressure in the chamber to vacuum pressure by a vacuum pump in a manufacturing process of a semiconductor, a large amount of gas flows temporarily. As a result, gas turbulence occurs in the chamber, a cloud of particles deposited on a chamber inner wall or the like is raised, and the particles may be deposited on a workpiece such as a semiconductor wafer.

In order to avoid the above circumstances, there is proposed one in which a tapered valve seat having a tapered face with a width increasing outward and a valve body having a tapered portion are provided to a vacuum valve disposed in a flow path connecting a vacuum chamber and a vacuum pump and a gap between the valve body and the tapered face, i.e., a valve opening degree is gradually changed by moving the valve body along a center line of the tapered valve seat to thereby restrictively exhaust the vacuum chamber. There is also proposed one in which a valve stroke is subtly changed by controlling fluid pressure by an electropneumatic proportional valve to thereby subtly change a valve opening degree.

However, in the vacuum valve having the tapered valve body and the tapered valve seat as described above, because an opening diameter of the valve seat is large, a rise in a gas flow rate for a valve stroke is large and it is substantially difficult to slowly exhaust the vacuum chamber. In a method for subtly changing the valve opening degree by the electropneumatic proportional valve, the electropneumatic proportional valve is required to have extremely high precision and a control mechanism is complicated, and the control lacks stability.

DISCLOSURE OF THE INVENTION

The present invention has been made with the above problems in view and it is an object of the invention to provide a pilot-type two-port vacuum valve in which a flow path can be gradually opened to slowly exhaust a vacuum chamber, a structure and operation of which are simple and easy, and which has excellent operation stability.

The above and other objects and novel features of the invention will become apparent from description of the present specification and the accompanying drawings.

To achieve the above object, according to the invention, there is provided a vacuum valve comprising: a first port to be connected to a vacuum chamber and a second port to be connected to a vacuum pump; a main flow path for connecting the first port and the second port and having a large cross-sectional area and an auxiliary flow path having a smaller cross-sectional area than the main flow path; a main valve body for opening and closing the main flow path and an auxiliary valve body for opening and closing the auxiliary flow path; a first piston connected to the main valve body through a first shaft and a second piston connected to the auxiliary valve body through a second shaft; a main pressure operating chamber for causing fluid pressure in a valve opening direction to act on the first piston and an auxiliary pressure operating chamber for causing fluid pressure in a valve opening direction to act on the second piston; a connecting hole for connecting the main pressure operating chamber and the auxiliary pressure operating chamber to each other; one operating port for supplying pressure fluid to the main pressure operating chamber and the auxiliary pressure operating chamber; and first spring means having large repulsing force for repulsing the main valve body in a closing direction and second spring means having small repulsing force for repulsing the auxiliary valve body in a closing direction.

There are such relationships between piston diameters of the first piston and the second piston and repulsing forces of the first spring means and the second spring means that the second piston is actuated by lower fluid pressure than the first piston.

In the vacuum valve of the invention with the above structure, if fluid of necessary pressure is supplied from the operating port to the main pressure operating chamber and the auxiliary pressure operating chamber, the second piston is first actuated against the repulsing force of the second spring means to open the auxiliary valve body. As a result, the first port and the second port communicate with each other through the auxiliary flow path having the small cross-sectional area and the vacuum chamber is slowly exhausted because of a small rise of a gas flow rate.

Then, if fluid pressure of the operating port increases, the first piston is actuated against the repulsing force of the first spring means to open the main valve body. As a result, the first port and the second port communicate with each other through the main flow path having the large cross-sectional area to thereby facilitate exhausting of the vacuum chamber.

Therefore, according to the vacuum valve of the invention, by only supplying pressure fluid a degree of which is controlled from the one operating port, it is possible to open the main valve body and the auxiliary valve body over time to slowly exhaust the vacuum chamber. Furthermore, the structure and operation are simple and easy and operation stability is excellent.

In the invention, it is preferable that the auxiliary valve body is formed of a needle valve and has a plurality of continuous tapered portions having different inclinations. As a result, it is possible to change the rise of the gas flow rate according to the opening degree of the needle valve.

According to another concrete embodiment of the invention, the vacuum valve has setting means for setting an opening degree of the auxiliary valve body. The opening degree setting means includes a setting rod a position of which can be adjusted to determine an open stroke end of the auxiliary valve body by coming into contact with the second shaft or the second piston and an adjusting member for adjusting the position of the setting rod.

According to another concrete embodiment of the invention, the main valve body is formed to have a larger sealing portion diameter than the auxiliary valve body and the first piston is formed to have the piston diameter larger than that of the second piston. The auxiliary flow path and the auxiliary valve body are incorporated into the main valve body, the second piston and the auxiliary pressure operating chamber are incorporated into the first piston, and the first shaft is inserted into the second shaft.

In this embodiment, if the opening degree setting means for setting the opening degree of the auxiliary valve body is provided, the setting rod is screwed to the first piston and disposed to move with the first piston and also functions as detecting means for detecting an opening degree of the main valve body from a moving amount of the first piston.

Otherwise, it is also possible to provide opening degree detecting means for detecting opening degrees of both the main valve body and the auxiliary valve body. The detecting means has one detecting rod moving in synchronization with both the first piston and second piston to detect the opening degrees of the main valve body and the auxiliary valve body from moving amounts of the first piston and the second piston output by the detecting rod.

DETAILED DESCRIPTION

Figure 1:
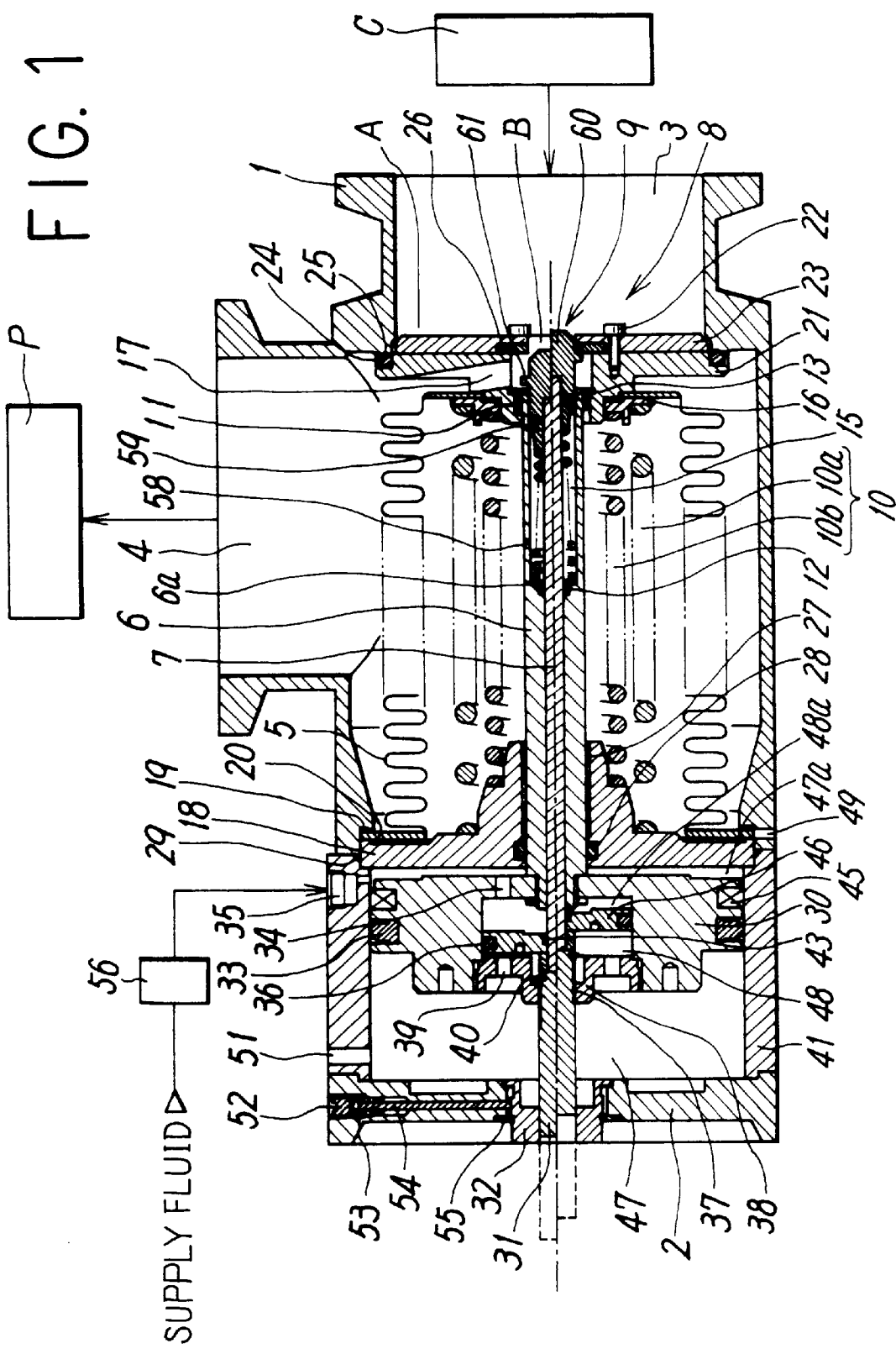
FIG. 1 is a sectional view respectively showing an open state and a closed state of a needle valve of a pilot-type two-port vacuum valve which is an embodiment of the present invention.

Embodiments of the present invention will be described below in detail based on the drawings. In describing the embodiments, components having similar functions are provided with similar reference numerals and described.

A pilot-type two-port vacuum valve shown in FIG. 1 has a substantially cylindrical casing 1. A cover 2 is mounted to an axially rear end portion of the casing 1, a first port 3 to be connected to a vacuum chamber C is formed in a tip end portion of the casing 1, and a second port 4 to be connected to a vacuum pump P in such an orientation to be orthogonal to an axis is formed in a side face of the casing 1. In the casing 1, a main flow path A for connecting the first port 3 and the second port 4 and having a large cross-sectional area and an auxiliary flow path B having a small cross-sectional area are provided and a main valve mechanism for fully opening and closing the main flow path A and an auxiliary valve mechanism for restrictively opening and closing the auxiliary flow path B are provided.

The main valve mechanism has a main valve body 8 for opening and closing a first valve seat portion 25 in the main flow path A, a first piston 30 actuated by operation of fluid pressure to drive the main valve body 8, and a first shaft 6 for connecting the main valve body 8 and the first piston 30 to each other.

The main valve body 8 is formed by providing a sealing member 24 for opening and closing the first valve seat portion 25 to a peripheral edge portion of a disc-shaped first valve holder 21 having an open central portion. The central opening of the first valve holder 21 forms a part of the auxiliary flow path B and communicates with the second port 4 through a connecting passage 17. A tip end portion of the first shaft 6 is fitted and locked into the central portion of the first valve holder 21 and fixed by a snap ring 13 so as not to come out. A reference numeral 11 in the drawing is a sealing member for maintaining airtightness between the first shaft 6 and the first valve holder 21.

A rear end portion of the first shaft 6 passes for sliding and airtightly through a pedestal 18 provided in the casing 1 through a guide bushing 27 and packing 28, projects into a first piston chamber 47 formed in a cylinder 41 between the pedestal 18 and the cover 2, and is airtightly connected to the first piston 30 disposed for sliding in the first piston chamber 47.

The first piston 30 has on an outer periphery thereof packing 33 in airtight and sliding contact with an inner wall of the first piston chamber 47 and a guide ring 45 and a main pressure operating chamber 47a defined between the first piston 30 and the pedestal 18 communicates with an operating port 35 formed in a side wall of the cylinder 41.

Therefore, if pressure fluid such as compressed air is supplied from the operating port 35 to the main pressure operating chamber 47a, the first piston 30 moves rearward toward the cover 2 and the main valve body 8 opens. In this case, pressure fluid with pressure controlled by an electropneumatic regulator 56 is supplied to the operating port 35. In the casing 1, first spring means 10 formed of two coil springs 10a and 10b for repulsing the main valve body 8 in a closing direction is provided between a spring receiver 16 mounted to the first valve holder 21 and the pedestal 18 and a bellows 5 in which the first shaft 6 and the two springs 10a and 10b are enveloped is provided between the bellows holder 20 and the first valve holder 21 mounted between the casing 1 and the pedestal 18. In FIG. 1, reference numerals 19 and 29 designate sealing members for maintaining airtightness between the casing 1 and the bellows holder 20 and between the casing 1 and the pedestal 18. A reference numeral 49 designates a breathing port for connecting inside space of the bellows 5 to an outside and a reference numeral 51 designates a breathing hole for connecting a breathing chamber behind the first piston 30 to the outside.

On the other hand, the auxiliary valve mechanism has an auxiliary valve body 9 for opening and closing a second valve seat portion 26 in the auxiliary flow path B provided to the main valve body 8, a second piston 46 actuated by operation of fluid pressure to drive the auxiliary valve body 9, and a second shaft 7 for connecting the auxiliary valve body 9 and the second piston 46 to each other and these respective members are integrally incorporated into the main valve mechanism as can be understood from the following description.

In other words, the second valve seat portion 26 is formed by mounting an annular sealing member to an annular second valve holder 23 coaxially fixed to the first valve holder 21 through a fixing bolt 22. The auxiliary valve body 9 is formed of a needle valve. The needle valve 9 has a fitted portion 60 formed into a gradually tapered shape and fitted into the second valve seat portion 26 and a flange-shaped valve sealing portion 61 formed in a position on a base end portion side of the fitted portion 60 to come in contact with and separate from the second valve seat portion 26, is housed for sliding in forward and rearward directions in a hollow portion formed in the tip end portion of the first shaft 6, and is repulsed in a valve closing direction by second spring means 15 formed of a coil spring provided between the auxiliary valve body 9 and a spring seat 6a provided to the first shaft 6. A seal diameter by the valve sealing portion 61 of the auxiliary valve body 9 is smaller than a seal diameter by the sealing member 24 of the main valve body 8.

In FIG. 1, a reference numeral 58 designates a breathing hole for connecting a back chamber of the needle valve 9 in which the second spring means 15 is disposed to the outside and a reference numeral 59 designates packing for maintaining airtightness between the first shaft 6 and the needle valve 9.

The second shaft 7 is inserted airtightly and for sliding into the first shaft 6 and a rear end portion of the second shaft 7 projects into a second piston chamber 48 formed in the first piston 30 and is airtightly connected to the second piston 46 disposed for sliding in the second piston chamber 48. In FIG. 1, a reference numeral 12 designates packing for maintaining airtightness between the second shaft 7 and the first shaft 6 and a reference numeral 43 designates a sealing member for maintaining airtightness between the second shaft 7 and the second piston 46.

The second piston 46 has on an outer periphery thereof packing 36 in airtight and sliding contact with an inner wall of the second piston chamber 48, an auxiliary pressure operating chamber 48a is define between the second piston 46 and the first piston 30 on a front face side of the second piston 46, and the auxiliary pressure operating chamber 48a and the main pressure operating chamber 47a communicate with each other through a connecting hole 34 formed in the first piston 30.

At a central portion of the cover 2 in the casing 1, opening degree setting means for setting an opening degree of the auxiliary valve body 9 is provided. The opening degree setting means includes a setting rod 31 a position of which can be adjusted to determine an open stroke end of the auxiliary valve body 9 by coming into contact with the second shaft 7 or the second piston 46 and an adjusting member 32 for adjusting the position of the setting rod 31. This will be described more specifically. A dial forming the adjusting member 32 is incorporated into the central portion of the cover 2 such that the dial can be operated by rotating and is prevented from coming off by a snap ring 55 and a retainer 38 having at a central portion thereof a screw hole 37 is fixed to a rear end face of the first piston 30. A tip end portion of the setting rod 31 is screwed down for forward and rearward movements by rotation into the screw hole 37 of the retainer 38 and a rear end portion of the setting rod 31 is inserted into the dial 32 such that the setting rod 31 can move with respect to the dial 32 in an axial direction and is connected to the dial 32 in a rotating direction. In FIG. 1, a reference numeral 39 designates a breathing hole for connecting a breathing chamber behind the second piston 46 to a breathing chamber behind the first piston 30 and a reference numeral 40 designates a snap ring for preventing the setting rod 31 from coming off the retainer 38.

A needle 54 for preventing spontaneous rotation of the dial 32 is mounted to the cover 2. The needle 54 is inserted into a hole formed in the cover 2 and a tip end of the needle 54 is pushed against a knurled outer periphery of the dial by a spring 53 provided between the needle 54 and a setscrew 52.

In order to connect the setting rod 31 and the dial 32 only in the rotating direction as described above, the setting rod 31 and the dial 32 may be formed into a shaft and a hole in shapes of a square, a rectangle, a hexagon, or the like, formed into a round shaft and a circular hole with parts of side faces thereof flattened, or formed into a shaft and a hole in proper sectional shapes respectively having a groove and a projection engaged with each other in the rotating direction only, for example. However, other proper connecting mechanisms may be also used.

The opening degree setting means can set the opening degree of the needle valve 9 by moving the setting rod 31 forward and rearward with respect to the second piston 46 by rotating the dial 32 to adjust the position of the open stroke end of the second piston 46. If pressure fluid is supplied through the operating port 35 from the main pressure operating chamber 47a to the auxiliary pressure operating chamber 48a, the second shaft 7 moves to such a position as to be in contact with the setting rod 31 by actuation of the second piston 46 and the needle valve 9 is opened with the opening degree according to the position.

The setting rod 31 also functions as detecting means for detecting the opening degree of the main valve body 8. In other words, because the setting rod 31 moves with the first piston 30 and the rear end portion of the setting rod 31 projects from the dial 32 to the outside, it is possible to monitor a valve opening amount of the main valve body 8 by detecting a projecting amount of the rear end portion. As means for detecting the projecting amount of the setting rod 31, optical, magnetic, or electrical detecting means may be used.

In the pilot-type two-port vacuum valve with the above structure, the main valve body 8 and the auxiliary valve body 9 are normally moved to the valve closing positions respectively by repulsing forces of the first spring means 10 and the second spring means 15 and come in contact with the first valve seat portion 25 and the second valve seat portion 26 to thereby respectively close the main flow path A and the auxiliary flow path B. Therefore, gas in the vacuum chamber C is not discharged from the first port 3 to the second port 4 if the vacuum pump P is operated in this state.

If pressure fluid such as compressed air pressure of which is controlled by the electropneumatic regulator 56 is supplied from the operating port 35 to the main pressure operating chamber 47a, the pressure fluid is also introduced into the auxiliary pressure operating chamber 48a through the connecting hole 34.

Then, if fluid pressure operating force acting on the second piston 46 in the auxiliary pressure operating chamber 48a becomes larger than repulsing force of the second spring means 15, the second piston 46 is actuated to move the second shaft 7 to such a position as to be in contact with the setting rod 31 against the repulsing force of the second spring means 15 to open the needle valve 9 to the set opening degree. As a result, gas in the vacuum chamber C gradually flows into the second port 4 through the restrictively opened auxiliary flow path B and the vacuum chamber C is exhausted slowly.

At this time, gas turbulence generated in a case of rapid exhausting is not generated in the vacuum chamber C and a cloud of particles is not raised by the turbulence. Overload due to temporary inhalation of a large amount of air by the vacuum pump P does not occur.

Then, if pressure of fluid supplied from the operating port 35 increased and fluid pressure operating force acting on the first piston 30 in the main pressure operating chamber 47a exceeds the repulsing force of the first spring means 10, the first piston 30 is actuated to move the first shaft 6 rearward to such a position as to be in contact with the cover 2 against the repulsing force of the first spring means 10 to thereby open the main valve body 8. As a result, the main flow path A with the large cross-sectional area opens to carry out remaining exhausting.

Because a density of air is low at this time, turbulence is not generated if the air is inhaled at a measure of speed and raising of the cloud of particles is not caused. Needless to say, overload of the vacuum pump P is not caused either.

If fluid pressure from the operating port 35 is reduced after a necessary degree of vacuum of the vacuum chamber C is obtained, the main valve body 8 first closes the main flow path A when the fluid pressure operating force acting on the first piston 30 becomes smaller than the repulsing force of the first spring means 10 and the auxiliary valve body 9 then closes the auxiliary flow path B when the fluid pressure operating force acting on the second piston 46 becomes smaller than the repulsing force of the second spring means 15.

Figure 2:
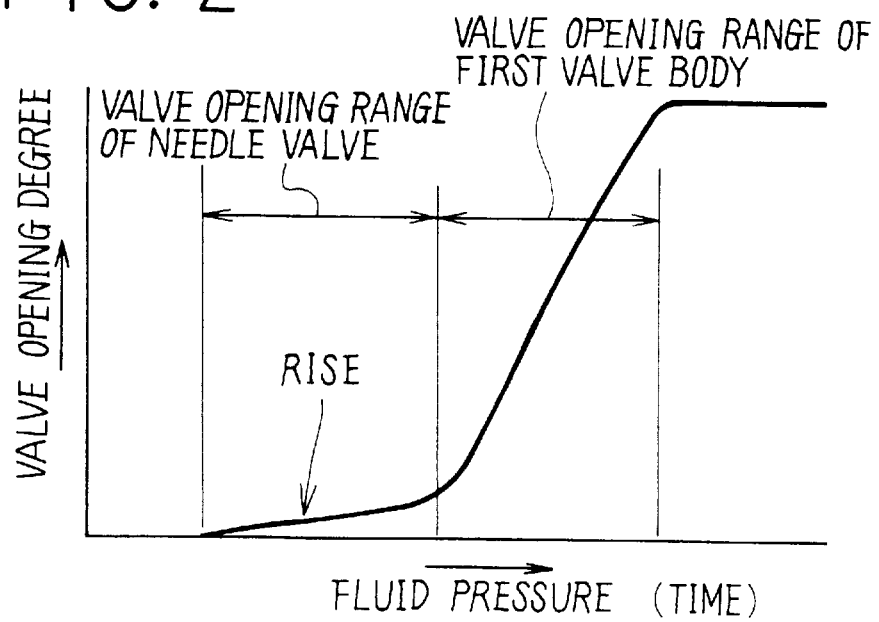
FIG. 2 is a valve opening degree-fluid pressure plot of the vacuum valve.

Operation of supplying fluid through the operating port 35 into the main pressure operating chamber 47a and the auxiliary pressure operating chamber 48a while controlling pressure of the fluid is automatically carried out by the electropneumatic regulator 56 and relationships between valve opening degrees of the main valve body 8 and the needle valve 9 and fluid pressure at this time change as shown in FIG. 2.

Opening and closing of the main valve body 8 and the needle valve 9 are controlled by controlling the electropneumatic regulator 56 by previously programmed control signals or by detecting pressure in the main pressure operating chamber 47a and the auxiliary pressure operating chamber 48a and performing control also including a time function based on a detection signal.

Because opening and closing of the auxiliary valve body 9 and the main valve body 8 are automatically controlled according to a degree of fluid pressure supplied to the operating port 35 in the pilot-type two-port vacuum valve of the embodiment as described above, operation is easy and stable. Because the opening degree of the auxiliary valve body 9 can be subtly adjusted, it is possible to reliably prevent raising of the cloud of particles in the vacuum chamber C, a prior-art high-precision electropneumatic proportional valve is unnecessary, and economics are improved.

Although the one embodiment of the invention has been described above in detail, the invention is not limited to the above embodiment and various modifications in design can be made without departing from spirit of the invention.

Figure 3:
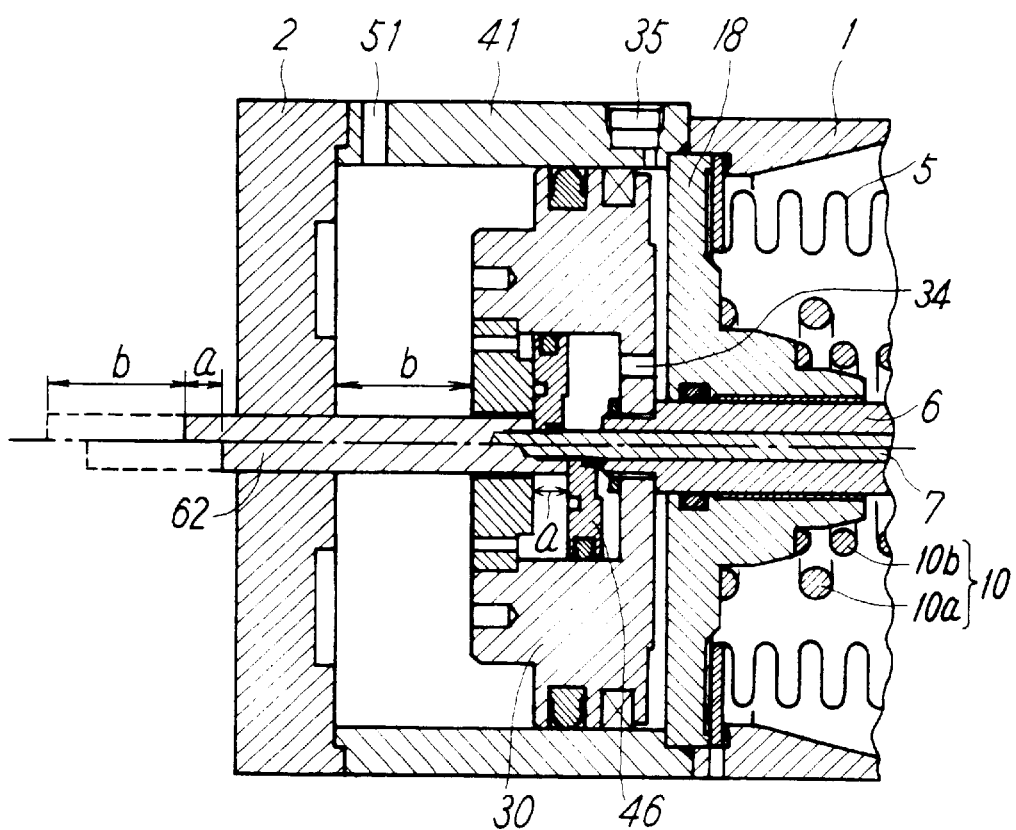
FIG. 3 is a sectional view of an essential portion respectively showing an open state and a closed state of a needle valve in another embodiment of the invention.

FIG. 3 shows one in which opening degree detecting means which can detect opening degrees of both the main valve body 8 and auxiliary valve body 9 is provided in stead of the opening degree setting means. The opening degree detecting means is formed by connecting one end of a detecting rod 62 to an end portion of the second shaft 7 and causing the other end of the detecting rod 61 to project from the cover 2 to the outside. By detecting an opening/closing stroke a of the auxiliary valve body 9 and an opening/closing stroke b of the main valve body 8 by optical, magnetic, or electrical detecting means from movement of the detecting rod 62 which moves in synchronization with both the first piston 30 and second piston 46, it is possible to detect the opening degrees of the main valve body 8 and the auxiliary valve body 9.

Figure 4:
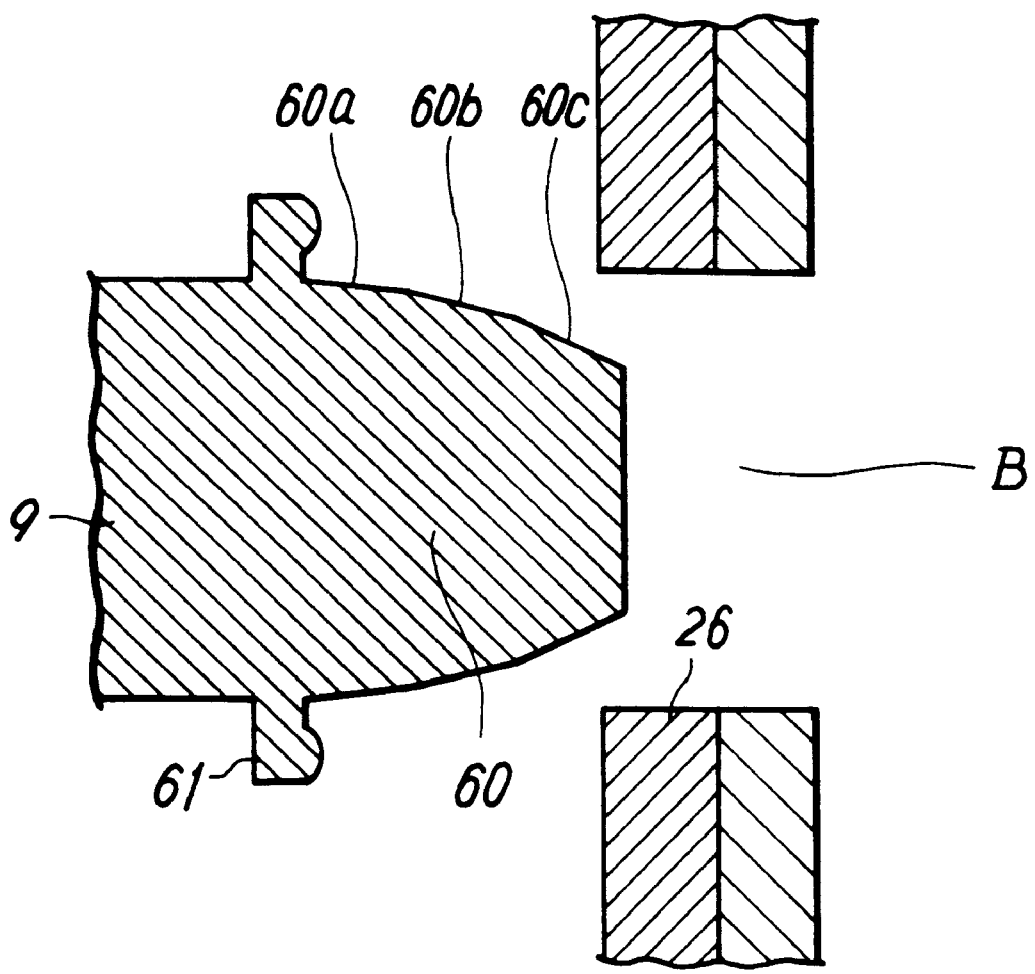
FIG. 4 is a sectional view of an essential portion showing a shape of a needle valve of another embodiment of the invention.

FIG. 4 shows another embodiment of the needle valve forming the auxiliary valve body 9. In the needle valve 9, a plurality of tapered portions 60a, 60b, and 60c having different inclinations are formed continuously at the fitted portion 60 and the valve opening degrees in opening and closing change in different manners depending on the tapered portions. It is also possible to form the fitted portion 60 of the needle valve 9 into a gradually tapered curved surface.

It is possible to detect pressure in the vacuum chamber C by a pressure sensor to control pressure of pressure fluid supplied to the operating port 35 based on a detection-signal to thereby obtain arbitrary pressure in the vacuum chamber C, not to mention to make the pressure in the vacuum chamber C vacuum pressure.

As can be understood from the above description, because the main valve body and the auxiliary valve body are opened and closed over time according to a degree of fluid pressure supplied to the operating port according to the pilot-type two-port vacuum valve of the invention, it is possible to slowly exhaust the vacuum chamber, structure and operation are simple and easy, and operation stability is excellent. Therefore, it is possible to reliably prevent raising of the cloud of particles and to improve reliability and the high-precision electropneumatic proportional valve is unnecessary.

What is claimed is:

1. A pilot-type two-port vacuum valve comprising:

a first port to be connected to a vacuum chamber and a second port to be connected to a vacuum pump;

a main flow path for connecting said first port and said second port and having a large cross-sectional area and an auxiliary flow path having a smaller cross-sectional area than said main flow path;

a main valve body for opening and closing said main flow path and an auxiliary valve body for opening and closing said auxiliary flow path;

a first piston connected to said main valve body through a first shaft and a second piston connected to said auxiliary valve body through a second shaft;

a main pressure operating chamber for causing fluid pressure in a valve opening direction to act on said first piston and an auxiliary pressure operating chamber for causing fluid pressure in a valve opening direction to act on said second piston;

a connecting hole for connecting said main pressure operating chamber and said auxiliary pressure operating chamber to each other;

one operating port for supplying pressure fluid to said main pressure operating chamber and said auxiliary pressure operating chamber; and first spring means having large repulsing force for repulsing said main valve body in a closing direction and second spring means having small repulsing force for repulsing said auxiliary valve body in a closing direction, wherein there are such relationships between piston diameters of said first piston and said second piston and repulsing forces of said first spring means and said second spring means that said second piston is actuated by lower fluid pressure than said first piston.

2. A vacuum valve according to claim 1, wherein said auxiliary valve body is a needle valve.

3. A vacuum valve according to claim 2, wherein said needle valve has a plurality of continuous tapered portions having different inclinations.

4. A vacuum valve according to claim 1 further comprising:

means for setting an opening degree of said auxiliary valve body, wherein said opening degree setting means includes a setting rod a position of which can be adjusted to determine an open stroke end of said auxiliary valve body by coming into contact with one of said second shaft and said second piston and an adjusting member for adjusting said position of said setting rod.

5. A vacuum valve according to claim 1, wherein said main valve body is formed to have a larger sealing portion diameter than said auxiliary valve body, said first piston is formed to have said piston diameter larger than that of said second piston, said auxiliary flow path and said auxiliary valve body are incorporated into said main valve body, said second piston and said auxiliary pressure operating chamber are incorporated into said first piston, and said second shaft is inserted into said first shaft.

6. A vacuum valve according to claim 5, wherein said auxiliary valve body is a needle valve.

7. A vacuum valve according to claim 6, wherein said needle valve has a plurality of continuous tapered portions having different inclinations.

8. A vacuum valve according to claim 5 further comprising:

means for setting an opening degree of said auxiliary valve body, wherein said opening degree setting means includes a setting rod a position of which can be adjusted to determine an open stroke end of said auxiliary valve body by coming into contact with one of said second shaft and said second piston and an adjusting member for adjusting said position of said setting rod and said setting rod is screwed to said first piston and disposed to move with said first piston and also functions as detecting means for detecting an opening degree of said main valve body from a moving amount of said first piston.

9. A vacuum valve according to claim 5 further comprising means for detecting opening degrees of said main valve body and said auxiliary valve body, wherein said opening degree detecting means has one detecting rod moving in synchronization with both said first piston and second piston to detect said opening degrees of said main valve body and said auxiliary valve body from moving amounts of said first piston and said second piston output by said detecting rod.

* * * * *